Figure 1:
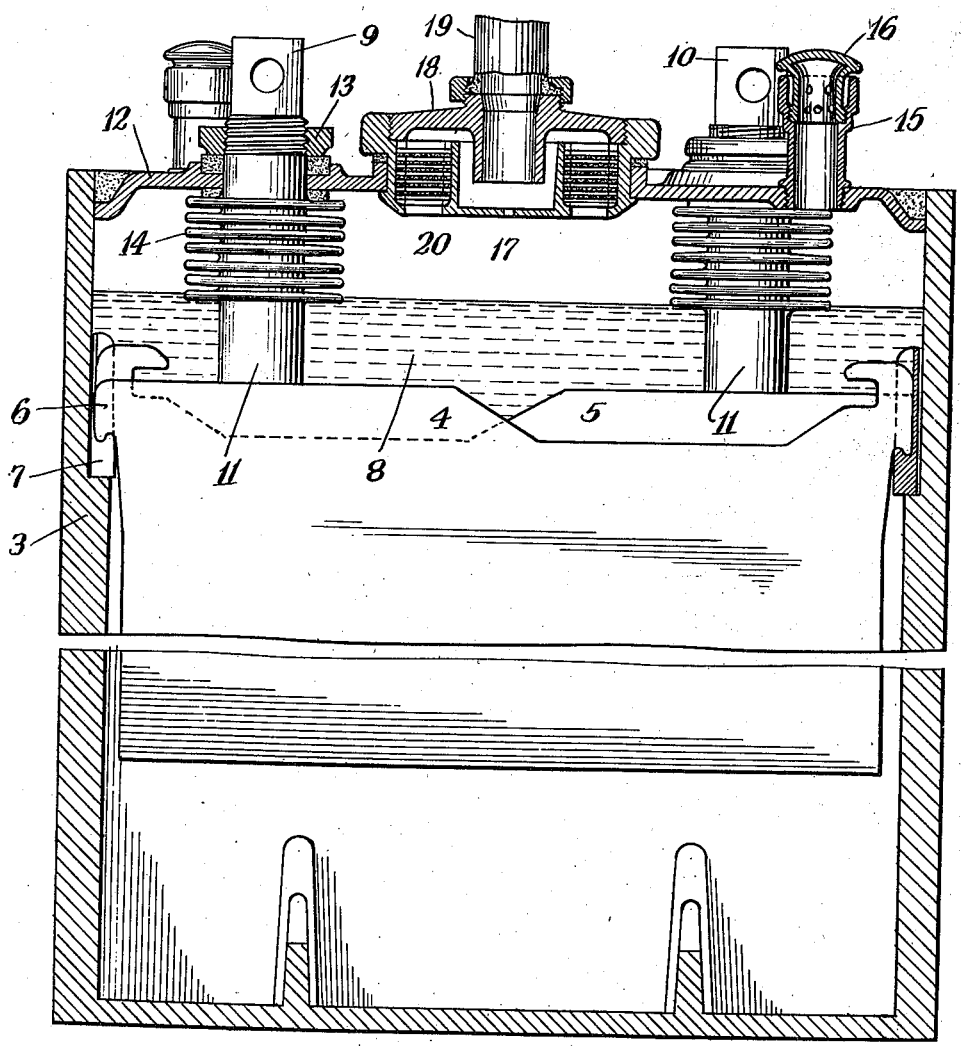

G. E. EDGAR.
STORAGE BATTERY INSTALLATION.
APPLICATION FILED DEC. 22, 1916.

1,275,007.

Patented Aug. 6, 1918.
2 SHEETS—SHEET 1.

G. E. EDGAR.
STORAGE BATTERY INSTALLATION.
APPLICATION FILED DEC. 22, 1916.

1,275,007.

Patented Aug. 6, 1918.
2 SHEETS—SHEET 2.

INVENTOR.

UNITED STATES PATENT OFFICE.

GRANT E. EDGAR, OF NEW LONDON, CONNECTICUT, ASSIGNOR TO ELECTRIC BOAT COMPANY, A CORPORATION OF NEW JERSEY.

STORAGE-BATTERY INSTALLATION.

1,275,007.  Specification of Letters Patent.  Patented Aug. 6, 1918.

Application filed December 22, 1916. Serial No. 138,351.

*To all whom it may concern:*

Be it known that I, GRANT E. EDGAR, a citizen of the United States, residing at New London, in the county of New London and State of Connecticut, have invented certain new and useful Improvements in Storage-Battery Installations; and I do hereby declare the following to be a full, clear, and exact description of the invention, such as will enable others skilled in the art to which it appertains to make and use the same.

This invention relates to storage battery installations and is directed to the provision of an improved construction for a storage battery whereby the latter is made more reliable and efficient in operation. The invention is adapted for use in storage batteries employed for various purposes but it is of special utility in the storage batteries of submarine boats.

In the operation of storage battery installations on submarine boats, there are two objectionable characteristics to be contended with, one, the generation of gases and the other the development of heat within the cells of the battery, more particularly during the latter part of the operation of charging the battery. It has now become a common practice to provide a system of ventilation whereby air is circulated into each of the cells of the battery, through the upper portion of each cell above the electrolyte therein and then out to a duct leading to the exterior. This air circulation is effective to dilute and render innocuous the gases generated within the cells of the battery and carry off the gases to the exterior. Also, it has been recognized that this circulation of air aids in carrying off heat from the interior of the cells so as to prevent an excessive rise of the temperature within the cells.

I have found that the provision of more effective means for carrying off heat from the interior of the cells of such a battery is highly desirable. This heat is generated throughout the electrolyte of the cells, more particularly during the latter part of the operation of charging the battery, and, of course, the current of air is effective to carry off the heat only as the heat rises to the top of the cell where it may be taken up by the air passing therethrough. I have found that the heat generated in a cell rises through the electrolyte of the cell to a relatively small extent; to a much greater extent, the heat passes from the electrolyte into the plates of the cell and passes up through these plates to the space above the level of the electrolyte, it being understood that the casing of the cell is usually made of some such substance as hard rubber, through which the heat cannot readily pass. And I have utilized this to improve the efficiency of a cell by providing metal parts within the cell above the level of the electrolyte and directly connected to the plates immersed in the electrolyte, by extending to a considerable degree the surface area of the portions of these metal parts above the level of the electrolyte, and by so arranging the parts that the air moving through the upper portion of the cell passes over this extended surface area of the metal parts. In this way, the heat generated within the cell may be carried off much more rapidly, or the heat may be carried off with sufficient rapidity with a reduced current of air, it being understood that a decrease of the amount of air passing through the upper portion of the cell is desirable as the passage of this air over the electrolyte increases the evaporation of the electrolyte. The provision of such metal parts above the level of the electrolyte and connected to the plates of the cell and having an extended surface area, may be accomplished in various ways. The electrical connections to the plates of such a cell are usually made through terminal posts each connected to the upper ends of the plates of one set and each passing upwardly through the cover plate of the cell to which the terminal post is secured. These terminal posts may be utilized for more effectively carrying off the heat generated within the cell in the manner above described by so forming them that the portions thereof above the level of the electrolyte present materially extended surfaces and by locating these terminal posts in favorable positions with respect to the path of the current of air passing through the upper portion of the cell. To this end, each of the terminal posts may be provided with a series of large thin flanges throughout the portions of the posts lying above the level of the electrolyte and these posts with their heat radiating flanges may be located approximately in line with the inlet and outlet openings for the current of air. With this construction, the heat generated within the cell passes into the plates of the cell and is transmitted upward therethrough along the metallic path offered thereby to and through the terminal posts to the heat radiating flanges thereon; from the extended surface area presented by these flanges the heat is taken up by the current of air which is passed through the cell for the double purpose of carrying off heat and diluting and carrying off gases.

The invention will be better understood by reference to the following description taken in connection with the accompanying drawings which show one form in which the invention may be utilized; it will be understood, however, that the invention is not limited to any one form but on the contrary may be utilized in storage battery cells differing widely as to their structural characteristics.

Figure 2:
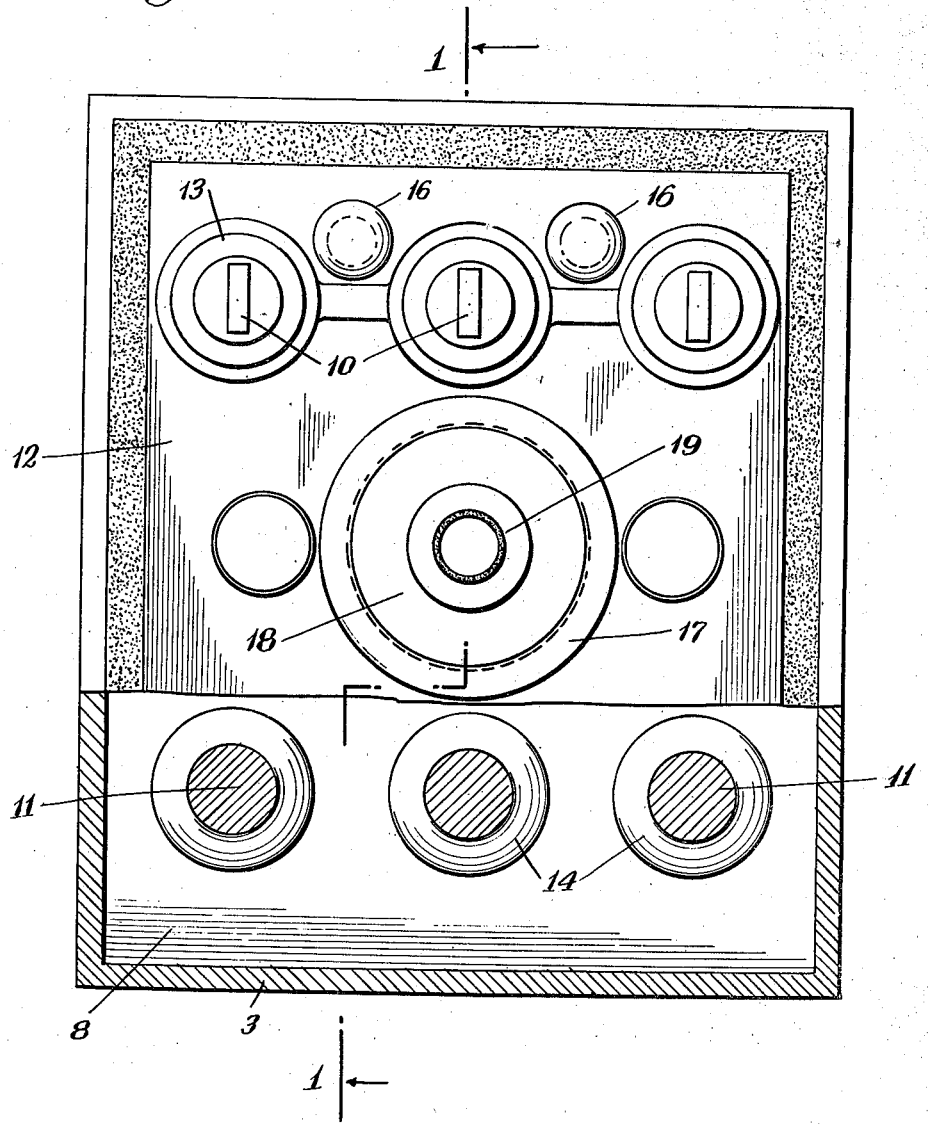

In these drawings, Figure 1 is a vertical section of a storage battery cell, the line of the section being indicated by the line 1—1 on Fig. 2, and Fig. 2 is a plan view, broken away and sectional in part, of the cell shown in Fig. 1.

Referring to these drawings, the cell consists of a casing 3 within which are mounted a plurality of positive and negative plates 4 and 5. These plates are mounted within the casing in any suitable manner, such, for instance, as that indicated involving the provision of lugs 6 at the upper ends of the side edges of the plates bearing on rails 7 secured to the sides of the casing 3. The plates 4 and 5 are immersed in an electrolyte 8 which is preferably maintained at the level indicated in Fig. 1, though in practice the level of the electrolyte falls substantially below that indicated and periodic replenishment is necessary. Electrical connection to the plates 4 and 5 is made through terminal posts 9 and 10. Preferably all of the positive plates and all of the negative plates or all of certain groups of these plates are connected to transverse conductors 11 and each of these conductors 11 is integral with one or more of the terminal posts 9 and 10. In the drawings, one conductor 11 is shown as connected to all of the positive plates and another one to all of the negative plates, and each of these conductors 11 is secured to or integral with three terminal posts 9 and 10 which extend upwardly through openings in the cover 12 of the cell. Each terminal post 9 and 10 is secured to the cover 12 by means of a lock-nut 13 coacting with suitable washers. Each of these terminal posts 9 and 10 is so formed as to considerably extend the surface area of the portion of the post located within the cell above the level of the electrolyte therein. For this purpose each terminal post is shown in the drawings as provided with a multiplicity of thin flanges 14 of substantial size, these flanges being parallel and close together. In the drawings the series of flanges 14 on the terminal posts are shown as extending upward close to the cover 12 and downward to the high level of the electrolyte within the cell. If desired, these flanges may be extended downward still farther, in which case they would be exposed one after another as the level of the electrolyte within the cell falls.

For the circulation of air through the upper portion of each cell of the battery to carry off heat and gases developed within the cell, each cell is provided with inlet and outlet openings through the cover thereof. Preferably, the upper ends of the cells enter within an air chamber from which air may pass freely through the inlet openings of the cells to the interior of the cells and each outlet opening of a cell is connected to a duct leading to the exterior of the battery. In the present instance the cell is shown as provided with four inlet openings each consisting of a tube 15 inserted in a threaded opening in the cover 12 of the cell and each provided with a protective hood 16. A single outlet from the cell is arranged at the center of the cover 12 consisting of a circular plug 17 threaded into an opening in the cover 12, an annular member 18 seated in this plug and a conduit 19 connected to the member 18. These parts are so formed as to provide a tortuous passage for air and the gases carried thereby from the interior of the cell through the outlet to the duct 19, a plurality of baffle plates 20 being preferably provided within the plug 17. The air inlets and the outlet are preferably so located that the air passing through them and through the top of the cell is caused to flow in immediate proximity to the terminal posts 9 and 10. Thus, by reference to Fig. 2, it will be seen that there are three of the terminal posts arranged in line adjacent to opposite sides of the cell and four air inlet openings are provided each arranged between a pair of adjacent terminal posts and on the side thereof away from the central outlet opening.

It will be seen that the construction herein illustrated and described involves the provision of a plurality of metallic members connected to the plates of a storage battery and extending upward therefrom to the space above the electrolyte of the cell and formed so as to greatly extend the surface area of the portions thereof lying above the electrolyte, in combination with means for circulating air through the upper portion of the cell for the purpose of carrying off gases and heat generated within the cell. The terminal posts by which electrical connection is made to the plates of the cell are preferably utilized as the metallic members connected to the plates and having the portions thereof above the level of the electrolyte formed so as to extend their surface area and the inlet and outlet openings by which the air circulation passes into and out of the cell are so located with respect to these terminal posts that the air passing therethrough flows closely about these portions of the terminal posts having the extended surface area.

I claim:

1. A storage battery cell having a casing, a plurality of plates therein, an electrolyte within the casing in which the plates are immersed, inlet and outlet openings in the upper portion of the cell through which air is circulated to carry off heat and gases developed within the cell, and metallic members connected to the plates and extending upwardly therefrom above the surface of the electrolyte within the cell and having the portions thereof above the surface of the electrolyte formed so as to present extended surfaces to the air passing through the upper portion of the cell; substantially as described.

2. A storage battery cell having a casing, a cover therefor, an electrolyte therein, positive and negative plates immersed in the electrolyte, terminal posts connected to the plates and extending upwardly therefrom above the surface of the electrolyte and through openings in the cover of the casing, said terminal posts having the portions thereof above the electrolyte and within the casing of the cell so formed as to substantially increase the surface area thereof, and inlet and outlet openings in the cell for the circulation of air through the upper portion of the cell to carry off heat and gases developed within the cell; substantially as described.

3. A storage battery cell having a casing, a cover therefor, an electrolyte within the casing, positive and negative plates immersed in the electrolyte, a plurality of terminal posts connected to the plates and extending upward therefrom above the surface of the electrolyte and through openings in the cover of the casing, a multiplicity of parallel flanges formed integral with the terminal posts on the portions thereof lying within the cell and above the surface of the electrolyte, a plurality of air inlet openings through the cover, each adjacent to one of the terminal posts, and an outlet opening through the cover located centrally with respect to the several inlet openings, the inlet and outlet openings providing means for the circulation of air through the upper portion of the battery to carry off gases and heat developed therein; substantially as described.

In testimony whereof I affix my signature.

GRANT E. EDGAR.